Dec. 2, 1941.  W. J. VOLLETT  2,264,465
WINDSHIELD WIPER
Filed Nov. 6, 1940  3 Sheets-Sheet 1
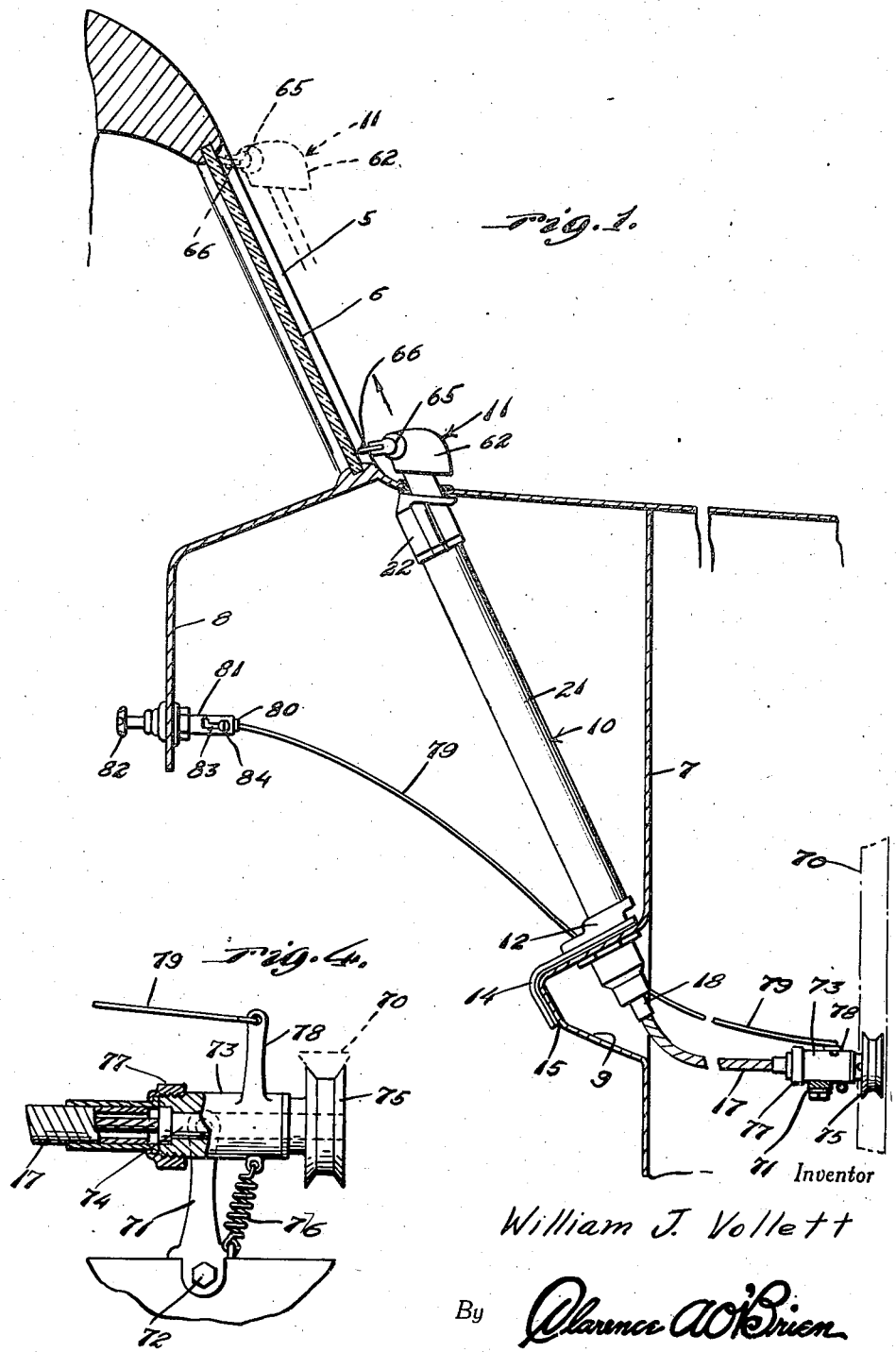
Inventor
William J. Vollett
By Clarence A. O'Brien
Attorney

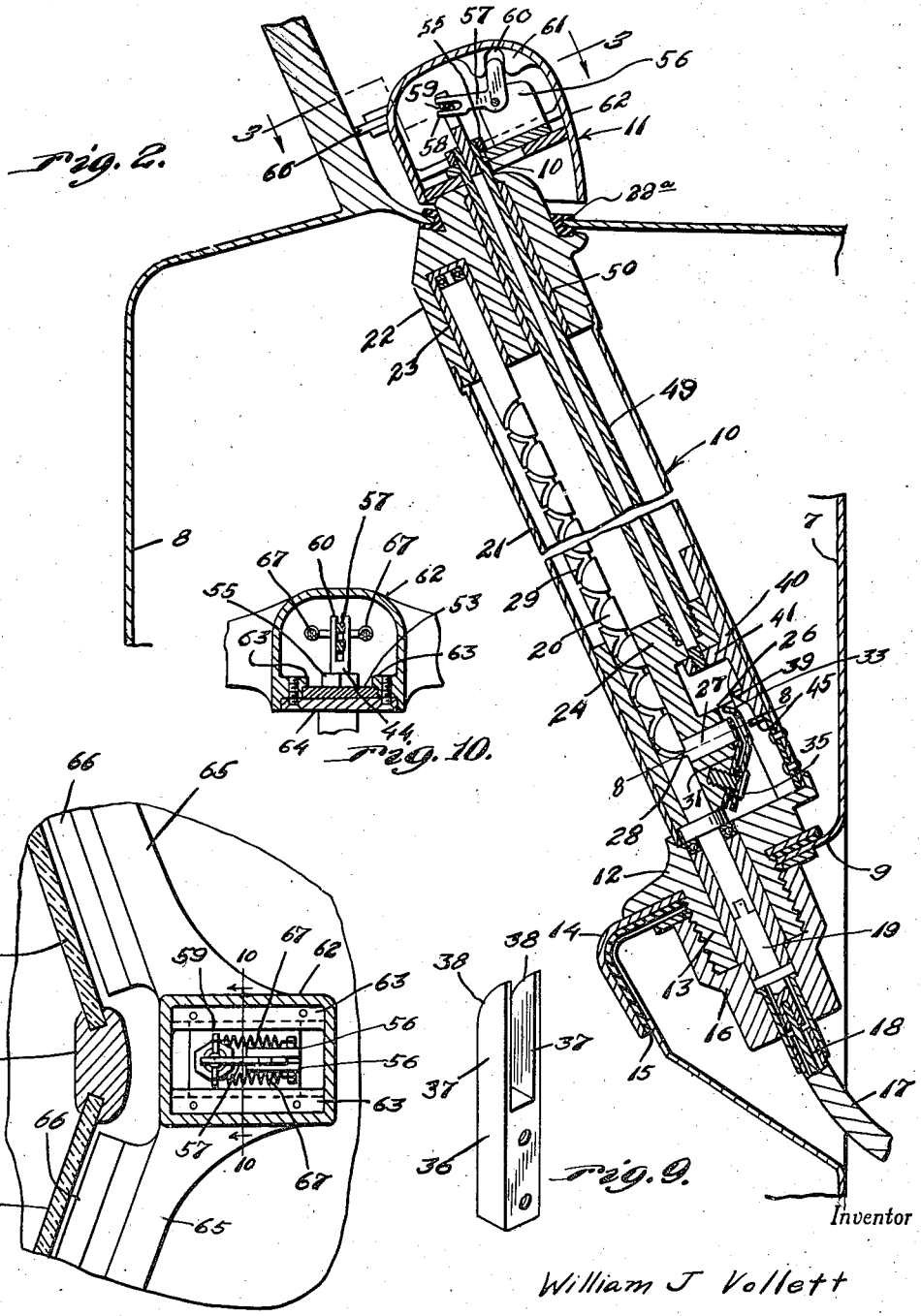

Dec. 2, 1941.  W. J. VOLLETT  2,264,465
WINDSHIELD WIPER
Filed Nov. 6, 1940  3 Sheets-Sheet 3

Inventor
William J. Vollett

By Clarence A. O'Brien

Attorney

Patented Dec. 2, 1941

2,264,465

UNITED STATES PATENT OFFICE 2,264,465

WINDSHIELD WIPER

William J. Vollett, Honor, Mich., assignor of one-half to Samuel Dumont, Muskegon Heights, Mich.

Application November 6, 1940, Serial No. 364,579

3 Claims. (Cl. 15—253)

This invention relates to new and useful improvements in windshield wipers and more particularly to a windshield wiper of the mechanically operated type.

The principal object of the present invention is to provide a windshield wiper which can be used on various types of windshields, such as the windshields of automobiles, busses, airplanes, et cetera, and which will have a downward wiping movement to the end that water and other foreign matter will be carried the shortest course off of the windshield.

Another important object of the invention is to provide a windshield wiper which is substantially automatic in operation in all respects.

Still another important object of the invention is to provide a windshield wiper which will depend upon direct mechanical connection with the operating parts of a vehicle instead of upon an independent power plant.

Other objects and advantages of the invention will become apparent to the reader of the following specification.

In the drawings:

Figure 1 represents a fragmentary vertical sectional view through a windshield and cowl portion of an automobile showing the improved windshield wiper mounted in place for use.

Figure 2 is an enlarged fragmentary detailed sectional view through the windshield wiper showing adjacent parts of a vehicle also in section.

Figure 3 is a section taken substantially on a line 3—3 of Figure 2.

Figure 4 is a fragmentary top plan view of the drive means for the wiper showing certain parts in section.

Figure 5 is a fragmentary detailed sectional view taken through the windshield and looking down upon the wiper.

Figure 6 is a perspective view of certain parts of the windshield wiper head structure.

Figure 7 is a fragmentary detailed perspective view showing certain parts of the reciprocating means in exploded relation.

Figure 8 is a sectional view on the line 8—8 of Figure 2.

Figure 9 is a perspective view of the track member.

Figure 10 is a sectional view on the line 10—10 of Figure 3.

Referring to the drawings, wherein like numerals designate like parts, it can be seen that numeral 5 denotes the usual windshield frame dividing the two panes 6. Numeral 7 denotes the usual cowl wall of an automobile body structure while numeral 8 denotes the usual instrument board. In carrying out the present invention, the cowl wall 7 has a deformed portion defining an inclined shelf 9 on which the windshield wiper reciprocating mechanism generally referred to by numeral 10 is mounted, and in turn the windshield wiper head generally referred to by numeral 11 is mounted upon the unit 10.

The unit 10 consists of a base member 12 having a threaded portion 13 disposed through a rigidifying plate 14, gasket 15 and opening in the shelf 9. Numeral 16 denotes a coupling nut, internally threaded to receive the threaded portion 13 of the base 12. Into the nut 16 is disposed a flexible conduit 17 which has a flexible shaft 18 disposed longitudinally therein.

A coupling 19 is provided between the shaft 18 and the lower end of the reversibly grooved feed shaft 20 which is disposed longitudinally in a shell 21 projecting upwardly from the base 12.

A body 22 is provided at the upper end of the shell 21 and has a bearing 23 therein for receiving the upper end of the shaft 20. The body has a surrounding gasket 22a which protects the inside of the cowl against inclement weather.

Numeral 24 denotes a carriage block having a bore therethrough, and through this bore extends the shaft 20. As shown in Figure 7, this carriage 24 consists of an elongated barrel having a pair of lateral formations 25 and 26. The lateral formation 26, as shown in Figure 2, has a bore therein receiving a pin 27 which has a tooth 28 riding in the groove 29 of the shaft 20. This protruding portion 26 is slotted as at 30 and a portion of the bottom is inclined. Against this inclined bottom of the member 26 is disposed the tail portion 31 of a spring 32 which normally bears against the outer end of the pin 27. A catch spring 33 having an opening 34 therein is likewise secured in place, a screw 35 serving to hold both of these elements 32 and 33 in place.

When the carriage 24 is at the lower portion of the shell 21, the spring 33 is riding the track element 36 which has a pair of track elements 37 projecting therefrom and having rounded end portions 38. The track element 36 serves to break the electric connection of the latch member 33 with a bevelled boss 39 carried by the lower end of a slide 40. This slide 40 has a lug 41 extending laterally therefrom and formed with a threaded opening 42 for receiving the lower threaded end 43 of a rod 44 which is employed to shift the head 11 toward and away from the windshield glass 6. As can be seen in Figure 2, the lower portion of the slide 40 with the boss 39 operates between the track elements 37 of the track 36, and is abutable against a stop 45. The lug 41 underlaps the lateral formation 25 on the carriage 24, and as can be seen in Figure 7, the formation 25 is longitudinally grooved as at 46 to slidably receive the slide 40.

As can be seen in Figure 7, the formation 25 is bored to receive the rod 44 and counterbored as at 47 to receive the lower threaded portion 48 of an elongated tube 49.

This tube 49 extends upwardly through a bushing 50 in the body 22 and through the upper end of the body 22. The upper end of the tube 49 is squared as at 51 to fit into a square opening 52 in a plate 53. The tube 49 has a threaded portion 54 at its upper end which extends above the opening 52 and accommodates a nut 55. The plate 53 has a pair of upstanding flanges 56 between which a bell-crank 57 is rockably mounted. One end of this bell-crank 57 is forked as at 58 to straddle the cross pin 59 in the bifurcated upper end 60 of the rod 44.

The other end of the bell-crank 57 operates in a notch 60 of a web 61 which depends from the upper portion of an open bottom dome 62 forming part of the head 11.

As can be seen in Figure 10, guide flanges 63, 63, are provided in the dome 62 and between these and a removable bottom plate 64, the plate 53 is located and upon this plate 53 the head structure 11 is adapted to move inwardly and outwardly with respect to the windshield glass 6, 6.

As can be seen in Figures 3 and 5, arms 65, 65, extend laterally from the dome 62 and carry squeegees 66.

As is shown in Figures 3 and 6, springs 67 extend from the ends of the cross pin 59 to anchoring elements 68 on the flanges 56.

It is preferable that power for the windshield wiper be obtained from the fan belt 70. On a stationary portion of the vehicle an arm 71 can be suitably secured as at 72. On this arm 71 is swingably mounted a barrel 73 through which a shaft 74 extends and is equipped with a pulley 75 which can be swung into engagement with the belt 70. A spring 76 between the barrel 73 and the arm 71 serves to normally maintain the pulley 75 away from the belt 70. As can be seen in Figure 4, the aforementioned flexible conduit 17 is connected to the barrel 73 as at 77.

An arm 78 extends laterally from the barrel 73 and has a control rod 79 connected thereto. The rod 79 extends to the instrument board 8 and to a slide member 80 operating in a barrel 81. This slide member 80 extends through the barrel and beyond the front of the instrument board 8 where it is provided with a knob 82. The barrel 81 has a bayonet slot 83 therein and a stud 84 extends from the slide 80 and into the bayonet slot 83. To hold the pulley 75 engaged with the belt 70, the slide 80 can be pulled outwardly and rotated so that the stud 84 will be prevented from returning in the slot.

It can now be seen that when the slide 80 is operated and the pulley 75 is engaging the belt 70, the reversibly grooved shaft 20 is rotating and, it will be assumed, moving the carriage 24 upwardly. When the head 11 is being elevated, the squeegees 66 are removed from the panes 6. However, when the slide 40 strikes the body 22 as the carriage 24 nears the body 22, the lug 41 will leave the lateral formation 25 and consequently there will be a movement of the tube 49 in relation to the rod 44 which will result in the operation of the bell-crank 57 which will serve to slide the dome 62 on the plate 53 toward the windshield and to the end that the squeegee 66 will engage the windshield glass. The carriage 24 has now reached a point where the shaft 20 will start to carry the same downwardly. The apertured spring 33 has snapped over the beveled boss 39 and the carriage will now pull the slide downwardly with the bell-crank 57 in this operating position, holding the squeegees against the windshield glass.

Thus it will be seen that while the squeegees will operate against the windshield glass on the downstroke, they will be moved upwardly in spaced relation with the glass.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A wiper for the windshield of an automobile comprising a driven squeegee carrying head movable vertically in opposite directions in a plane parallel to the plane of the windshield, and movable at a right angle to said plane toward and from said windshield to engage the squeegee therewith and disengage the same therefrom, respectively, means to drive said head vertically including a reciprocating carriage, and means to move said head under control of the carriage comprising a shaft reciprocating with the carriage, and means to reverse the movement of the shaft as the carriage approaches the limit of its movement in one direction.

2. A wiper for the windshield of an automobile comprising a driven squeegee carrying head movable vertically in opposite directions in a plane parallel to the plane of the windshield, and movable at a right angle to said plane toward and from said windshield to engage the squeegee therewith and disengage the same therefrom, respectively, means to drive said head vertically including a reciprocating carriage, means to move said head under control of the carriage comprising a shaft reciprocating with the carriage, means to reverse movement of the shaft as the carriage approaches the limit of its movement in one direction, and means to releasably lock the shaft to the carriage after reverse movement thereof.

3. A wiper for the windshield of an automobile comprising a driven squeegee carrying head movable vertically in opposite directions in a plane parallel to the plane of the windshield, and movable at a right angle to said plane toward and from said windshield to engage the squeegee therewith and disengage the same therefrom, respectively, means to drive said head vertically including a reciprocating carriage, means to move said head under control of the carriage comprising a shaft reciprocating with the carriage, means to reverse movement of the shaft as the carriage approaches the limit of its movement in one direction, means to releasably lock the shaft to the carriage after reverse movement thereof, and means to unlock said shaft in the opposite limit of movement of the carriage.

WILLIAM J. VOLLETT.